United States Patent
Herring et al.

(10) Patent No.: US 11,989,128 B1
(45) Date of Patent: May 21, 2024

(54) INVALIDITY PROTECTION FOR SHARED CACHE LINES

(71) Applicant: INTERNATIONAL BUSINESS MACHINES CORPORATION, Armonk, NY (US)

(72) Inventors: Winston Herring, Austin, TX (US); Gregory William Alexander, Pflugerville, TX (US); Timothy Bronson, Round Rock, TX (US); Jason D Kohl, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 42 days.

(21) Appl. No.: 18/066,575

(22) Filed: Dec. 15, 2022

(51) Int. Cl.
*G06F 12/08* (2016.01)
*G06F 12/0831* (2016.01)
*G06F 12/084* (2016.01)
*G06F 12/0862* (2016.01)

(52) U.S. Cl.
CPC ........ *G06F 12/084* (2013.01); *G06F 12/0833* (2013.01); *G06F 12/0862* (2013.01)

(58) Field of Classification Search
None
See application file for complete search history.

(56) References Cited

U.S. PATENT DOCUMENTS

| | | | |
|---|---|---|---|
| 6,336,169 B1 | 1/2002 | Arimilli et al. | |
| 6,557,084 B2 | 4/2003 | Freerksen et al. | |
| 10,452,300 B2 | 10/2019 | Ogawa | |
| 10,628,313 B2 | 4/2020 | Blake et al. | |
| 10,795,824 B2 | 10/2020 | Berger et al. | |
| 2013/0339609 A1* | 12/2013 | Bronson | G06F 12/0817 711/122 |
| 2016/0110287 A1 | 4/2016 | Bronson et al. | |
| 2019/0146916 A1* | 5/2019 | Matsakis | G06F 12/084 711/130 |
| 2019/0370186 A1 | 12/2019 | Berger et al. | |
| 2020/0159665 A1 | 5/2020 | Berger et al. | |

(Continued)

FOREIGN PATENT DOCUMENTS

KR 1020060037505 A 10/2004

OTHER PUBLICATIONS

Notification of Transmittal of the International Search Report and the Written Opinion of the International Searching Authority, or the Declaration, PCT/CN2023/133608, Feb. 8, 2024, 9 pages.

(Continued)

*Primary Examiner* — Kevin Verbrugge
(74) *Attorney, Agent, or Firm* — Edward J. Wixted, III, Esq.; Blanche E. Schiller, Esq.; Heslin Rothenberg Farley & Mesiti P.C.

(57) ABSTRACT

A node of the computing environment obtains an exclusive fetch request of a cache line shared by, at least, the node and a manager node of the computing environment. The exclusive fetch request includes a state indication regarding processing of the exclusive fetch request by the manager node. The node processes the exclusive fetch request, based on the state indication included with the exclusive fetch request regarding processing of the exclusive fetch request by the manager node.

20 Claims, 13 Drawing Sheets

(56) References Cited

U.S. PATENT DOCUMENTS

2020/0264977 A1* 8/2020 Iyengar .............. G06F 12/0826

OTHER PUBLICATIONS

Anonymous, "Implementing Locks In A Shared-Memory Multiprocessor Using a Simplified Coherence Protocol," IP.com No. IPCOM000200052D, Sep. 24, 2010, pp. 1-5 (+ cover).
Anonymous, "System and Method for Software Debug Using Fast Cache Simulation by Separation of Data and Tag Views," IP.com No. IPCOM000267673D, Nov. 15, 2021, pp. 1-5 (+ cover).
Anonymous, "TileLink Cacheable Snoop Status Method," IP.com No. IPCOM000264459D, Dec. 18, 2020, pp. 1-5 (+ cover).
Kloda, Tomasz et al., "Deterministic Memory Hierarchy and Virtualization for Modern Multi-Core Embedded Systems," 2019 IEEE Real-Time and Embedded Technology and Applications Symposium, Apr. 2019, 14 pages.
Yoon, Hongil et al., "Reducing Coherence Overheads with Multi-line Invalidation (MLI) Messages," 2003 (no further date information available), 13 pages.
Yuan, Xin et al., "A Timestamp-based Selective Invalidation Scheme for Multiprocessor Cache Coherence," 1996 International Conference on Parallel Processing, Aug. 12, 1996, 8 pages.

* cited by examiner

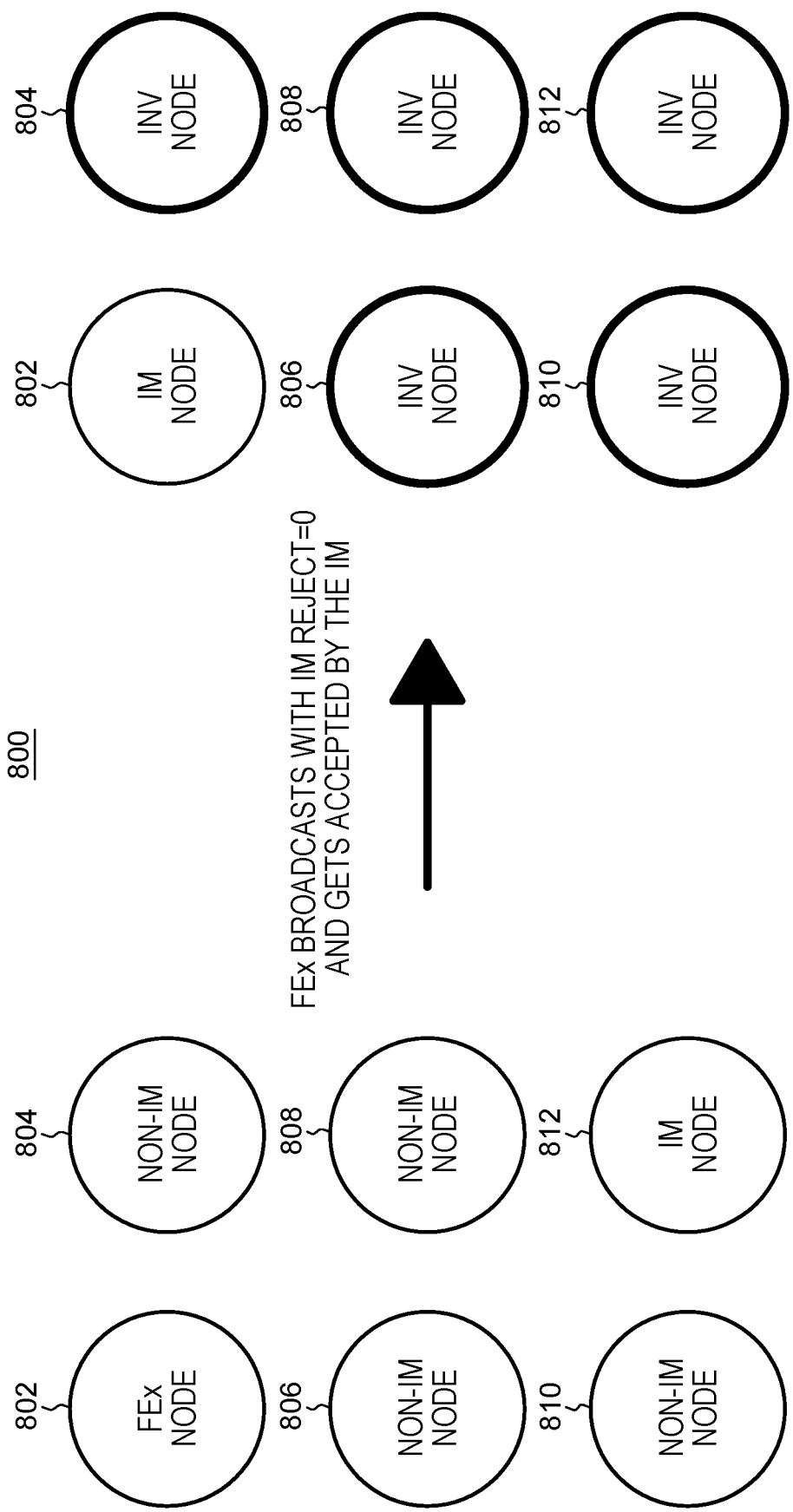

INVALIDITY PROTECTION FOR SHARED CACHE LINES

BACKGROUND

One or more aspects relate, in general, to facilitating processing within a computing environment, and in particular, to improving cache processing within the computing environment.

To improve memory access, many computing environments use a cache system in which recently accessed data is stored in caches, which are closer in proximity than system memory to the nodes accessing the caches. In one example, each node of a plurality of nodes of a computing environment has a cache and cache lines may be shared between the nodes in that a read-only copy of a cache line may be present in multiple caches of multiple nodes.

When a node requests a cache line that is present in at least one other node's cache, a manager node for that cache line is responsible for responding to the request. Requests for the cache line may be read-only in which multiple nodes may be fetching the line for read purposes or exclusive fetch in which only one node is allowed to fetch the line for update purposes.

An exclusive fetch of a cache line is considered successful if it is accepted by the manager node, as well as the other non-manager nodes. If a node is busy for a different fetch to the same cache line or is out of fetch-servicing resources, that node will reject the exclusive fetch and the exclusive fetch will have to be re-tried. This processing is to be improved to improve overall processing within the computing environment.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes obtaining, by a node of the computing environment, an exclusive fetch request of a cache line shared by, at least, the node and a manager node of the computing environment. The exclusive fetch request includes a state indication regarding processing of the exclusive fetch request by the manager node. The node processes the exclusive fetch request, based on the state indication included with the exclusive fetch request regarding processing of the exclusive fetch request by the manager node.

By including the state indication with the exclusive fetch request, the node can determine how to process the request. For instance, the node may accept the request, based on the state indication, and thus, invalidate its copy of the cache line; or the node may reject the request, based on the state indication, and therefore, not invalidate its copy of the cache line. This facilitates processing by performing invalidations of the cache line in selected circumstances, such as based on the state indication, rather than invalidating on each re-broadcast of the exclusive fetch request. This enables the number of invalidations of the cache line to be reduced, thereby protecting copies of the cache line.

In one embodiment, the state indication includes an accept indicator indicating whether the manager node has accepted the exclusive fetch request. This facilitates processing by indicating to the node when the manager node has accepted the exclusive fetch request. Therefore, the node can also accept the exclusive fetch request and invalidate its copy of the cache line, rather than invalidating on each re-try of the exclusive fetch. This saves processing cycles and reduces system memory access.

In one embodiment, the state indication further includes a rejection indicator indicating whether the manager node has rejected the exclusive fetch request. This facilitates processing by indicating to the node when the manager node has rejected the exclusive fetch request, and therefore, the node can also reject the exclusive fetch request and not invalidate its copy of the cache line. This facilitates processing by reducing the number of invalidations of the cache line by the node.

In one embodiment, the state indication includes a rejection indicator indicating whether the manager node has rejected the exclusive fetch request. This facilitates processing by indicating to the node when the manager node has rejected the exclusive fetch request, and therefore, the node can also reject the exclusive fetch request and not invalidate its copy of the cache line. This facilitates processing by reducing the number of invalidations of the cache line by the node.

In one embodiment, the rejection indicator further indicates a reason for rejecting the exclusive fetch request. This facilitates processing by indicating to the node when the manager node has rejected the exclusive fetch request for a selected reason, and therefore, the node can decide to reject the exclusive fetch request and not invalidate its copy of the cache line. This facilitates processing by reducing the number of invalidations of the cache line by the node.

In one embodiment, the processing includes determining, based on the rejection indicator, that the manager node has rejected the exclusive fetch request for a selected reason. Based on determining that the manager node has rejected the exclusive fetch request for the selected reason, the node rejects the exclusive fetch request. By using the rejection indicator provided with the exclusive fetch request, the node can determine how to process the request. For instance, the node may reject the request, based on the rejection indicator, and therefore, not invalidate its copy of the cache line. This facilitates processing by not performing invalidations of the cache line in certain circumstances, such as based on a rejection of the exclusive fetch request by the manager node for the selected reason. This enables the number of invalidations of the cache line to be reduced, thereby protecting copies of the cache line.

In one embodiment, the processing includes determining, based on the state indication, that the manager node has rejected the exclusive fetch request. Based on determining that the manager node has rejected the exclusive fetch request, the node rejects the exclusive fetch request. By using the state indication provided with the exclusive fetch request, the node can determine how to process the request. For instance, the node may reject the request, based on the state indication indicating that the manager node rejected the exclusive fetch request, and therefore, not invalidate its copy of the cache line. This facilitates processing by not performing invalidations of the cache line in certain circumstances, such as based on a rejection of the exclusive fetch request by the manager node. This enables the number of invalidations of the cache line to be reduced, thereby protecting copies of the cache line.

In one embodiment, the computing environment includes a plurality of nodes to receive the exclusive fetch request. Based on determining that the manager node has rejected the exclusive fetch request, the rejecting is performed by the plurality of nodes receiving the exclusive fetch request. By using the state indication provided with the exclusive fetch request, the nodes can determine how to process the request. For instance, the nodes may reject the request, based on the state indication indicating that the manager node has rejected the exclusive fetch request, and therefore, not invalidate their copies of the cache line. This facilitates processing by not performing invalidations of copies of the cache line in certain circumstances, such as based on a rejection of the exclusive fetch request by the manager node. This enables the number of invalidations of the cache line to be reduced, thereby protecting copies of the cache line.

In one embodiment, the processing includes determining, based on the state indication, that the manager node has accepted the exclusive fetch request. Based on determining that the manager node has accepted the exclusive fetch request, the node accepts the exclusive fetch request. By using the state indication to determine that the manager node has accepted the exclusive fetch request, the node can also accept the exclusive fetch request and invalidate its copy of the cache line, rather than invalidate on each re-try of the exclusive fetch. This saves processing cycles and reduces system memory access.

In one embodiment, the computing environment includes multiple levels of manager nodes, and the state indication for which the processing is based is the state indication of a selected manager node on a selected level of the multiple levels. By including the appropriate state indication with the exclusive fetch request, the node can determine how to process the request. For instance, the node may accept the request, based on the state indication, and thus, invalidate its copy of the cache line; or the node may reject the request, based on the state indication, and therefore, not invalidate its copy of the cache line. This facilitates processing by performing invalidations of the cache line in selected circumstances, such as based on the state indication, rather than invalidating on each re-broadcast of the exclusive fetch request. This enables the number of invalidations of the cache line to be reduced, thereby protecting copies of the cache line.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 8 pictorially depicts another example of shared cache line protection, in accordance with one or more aspects of the present invention.

DETAILED DESCRIPTION

Figure 1:
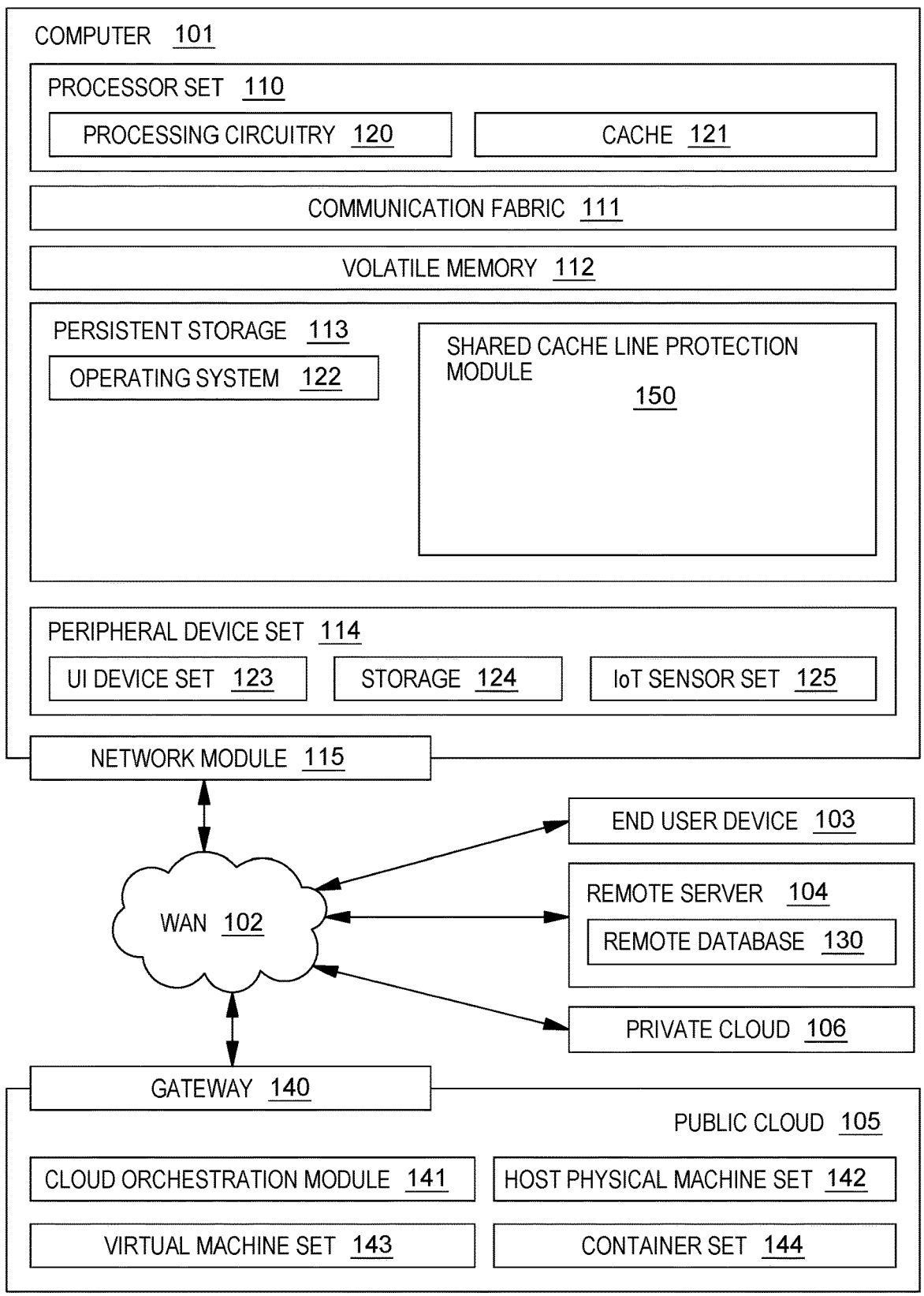
FIG. 1 depicts one example of a computing environment to incorporate and use one or more aspects of the present invention.

In accordance with one or more aspects of the present invention, a capability is provided to facilitate processing within a computing environment. In one or more aspects, the capability includes improving the use of caches, and in particular, the processing of exclusive fetch requests of cache lines within the caches. In one or more aspects, the capability includes protecting shared cache lines from unnecessary invalidation based on rejected exclusive fetch requests.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., processes exclusive fetch requests for shared cache lines such that unnecessary invalidations of copies of the cache lines are reduced, and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as shared cache line protection code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 2:
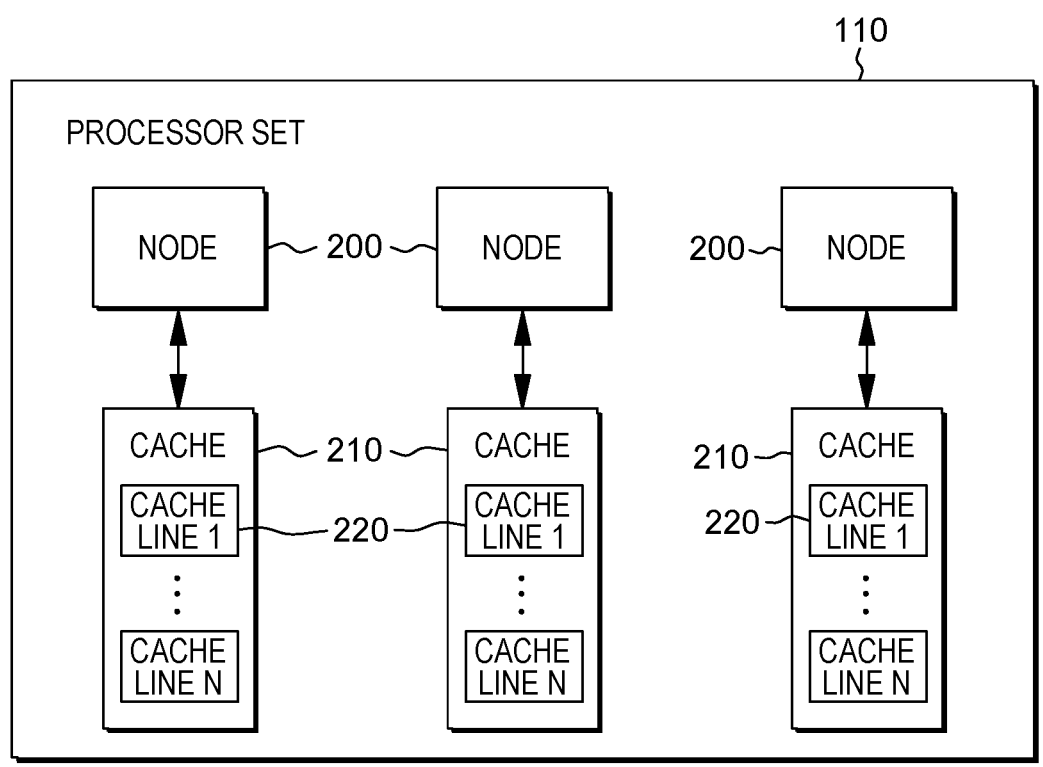
FIG. 2 depicts one example of further details of a processor set of FIG. 1, in accordance with one or more aspects of the present invention.

Further details of one example of a processor set (e.g., processor set 110) are described with reference to FIG. 2. In one example, a processor set (e.g., processor set 110) includes a plurality of nodes 200, in which each node is, for instance, a core or a central processing unit of a processor of the processor set (e.g., processor set 110). Each node, in one example, is coupled to a cache, such as cache 210, used to store data accessed by the node. Each cache may be part of cache 121 of FIG. 1, as an example. In one example, the caches may be interconnected.

In one example, a cache (e.g., cache 210) includes a plurality of cache lines (e.g., cache lines 220), in which a cache line is a unit of data that is transferred between the cache and main memory (e.g., volatile memory 112; persistent storage 113; etc.). A cache line (e.g., cache line 220) is typically fixed in size and may range from, e.g., 16 to 256 bytes in size. Although a size range is provided as an example, a cache line may have additional and/or fewer bytes than the examples provided herein. Also, in another example, a cache line may have a variable size. Many variations are possible.

A cache line, such as cache line 220, may be shared in that a read-only copy of the cache line may be fetched from memory (e.g., volatile memory 112; persistent storage 113; etc.) and stored in a plurality of caches (e.g., caches 210) of a plurality of nodes (e.g., nodes 200). If a cache line is to be updated, then an exclusive fetch is performed, in which one node of the plurality of nodes obtains authorization to change the cache line in one of the caches. The corresponding cache lines in the other caches are invalidated. This provides data protection ensuring that the latest copy of the data is used by the nodes sharing the cache line.

In one example, for a given request of a cache line, one of the nodes of the plurality of nodes is a requesting node (e.g., a read-only fetch node, an exclusive fetch node) that requests access to the cache line (e.g., read-only, exclusive); one of the nodes is a manager node (may also be referred to herein as an intervention manager node, an intervention manager or a manager) responsible for responding to the request; and one or more of the nodes are non-manager nodes (may also be referred to herein as a non-intervention manager node, a non-intervention manager or a non-manager). The responsibility or status of a particular node changes, in one example, based on, for instance, processing of the given cache line request and/or based on other cache line requests. For instance, a requesting node becomes, in one example, a manager node based on receiving authority to perform the request. Other examples are also possible, including an example in which the responsibility as manager node does not change based on receiving authority to perform the request. Many examples are possible.

In one example, based on a node becoming a manager node, an indication is placed, for instance, in a cache directory, such as in a cache directory entry corresponding to the cache line, or in another location, indicating the node is the current manager node.

When a given cache line request is, for instance, an exclusive fetch request, the exclusive fetch is to be accepted by the manager node, as well as the non-manager nodes for the exclusive fetch to be successful. Based on a node, such as a non-manager node, accepting the request, the non-manager node invalidates its copy of the given cache line. If a node is busy for a different fetch to the same cache line or out of fetch servicing resources, the node rejects the exclusive fetch. If, for instance, the manager node rejects or does not accept the exclusive fetch request, the exclusive fetch fails resulting in potentially unnecessary invalidations by the other nodes. For instance, an exclusive fetch to a cache line experiencing contention may cause non-manager nodes to invalidate their copies of the cache line without the exclusive fetch being accepted by the manager node. The non-manager nodes still wish to have their read-only copies, and thus re-fetch the cache line, further increasing contention. The increased contention makes the exclusive fetch less likely to be successful on re-tries. Therefore, one or more unnecessary invalidations may be performed prior to the successful exclusive fetch request. They are deemed unnecessary since the exclusive fetch request was not granted or failed, and thus, the corresponding cache lines did not have to be invalidated.

To reduce unnecessary invalidations of the cache lines in non-manager nodes, in accordance with an aspect of the present invention, invalidation of the cache lines is performed based on a particular event, such as acceptance by a manager node of the exclusive fetch request. One or more invalidations are avoided until it is expected that the exclusive fetch will be successfully performed. Therefore, as many copies of the contested cache line, as possible, are preserved when the exclusive fetch request has already been rejected by the manager node. For instance, the non-manager nodes reject the exclusive fetch request that has been rejected by the manager node, until the exclusive fetch request is accepted by the manager node. This reduces processing costs and memory access latency, and increases processing speed.

To protect shared cache lines from one or more unnecessary invalidations, a shared cache line protection module (e.g., shared cache line protection module 150) is used, in accordance with one or more aspects of the present invention. A shared cache line protection module (e.g., shared cache line protection module 150) includes code or instructions used to perform shared cache line protection processing, in accordance with one or more aspects of the present invention. A shared cache line protection module (e.g., shared cache line protection module 150) includes, in one example, various sub-modules to be used to perform the processing. The sub-modules are, e.g., computer readable program code (e.g., instructions) in computer readable media, e.g., storage (storage 124, persistent storage 113, cache 121, other storage, as examples). The computer readable media may be part of a computer program product and may be executed by and/or using one or more computers, such as computer(s) 101; one or more servers, such as remote server(s) 104; one or more processors or nodes, such as processor(s) or node(s) of processor set 110; and/or processing circuitry, such as processing circuitry 120 of processor set 110; etc. Additional and/or other computers, servers, processors, nodes and/or processing circuitry may be used to execute one or more of the sub-modules and/or portions thereof. Many examples are possible.

Figure 3:
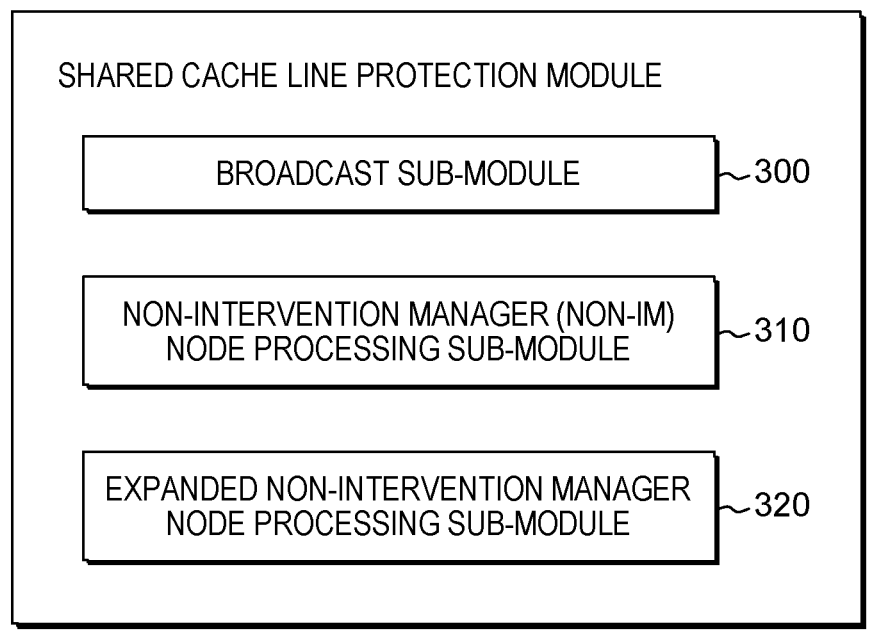
FIG. 3 depicts one example of sub-modules of a shared cache line protection module of FIG. 1, in accordance with one or more aspects of the present invention.

One example of shared cache line protection module 150 is described with reference to FIG. 3. In one example, shared cache line protection module 150 includes a broadcast sub-module 300 used in broadcasting an exclusive fetch request to a plurality of nodes; a non-intervention manager node (also referred to herein as a non-manager node) processing sub-module 310 used in processing an exclusive fetch request; and an expanded non-intervention manager node processing sub-module 320 used in further processing of an exclusive fetch request. Additional, fewer and/or other sub-modules may be provided and/or used in one or more aspects of the present invention.

Figure 4:
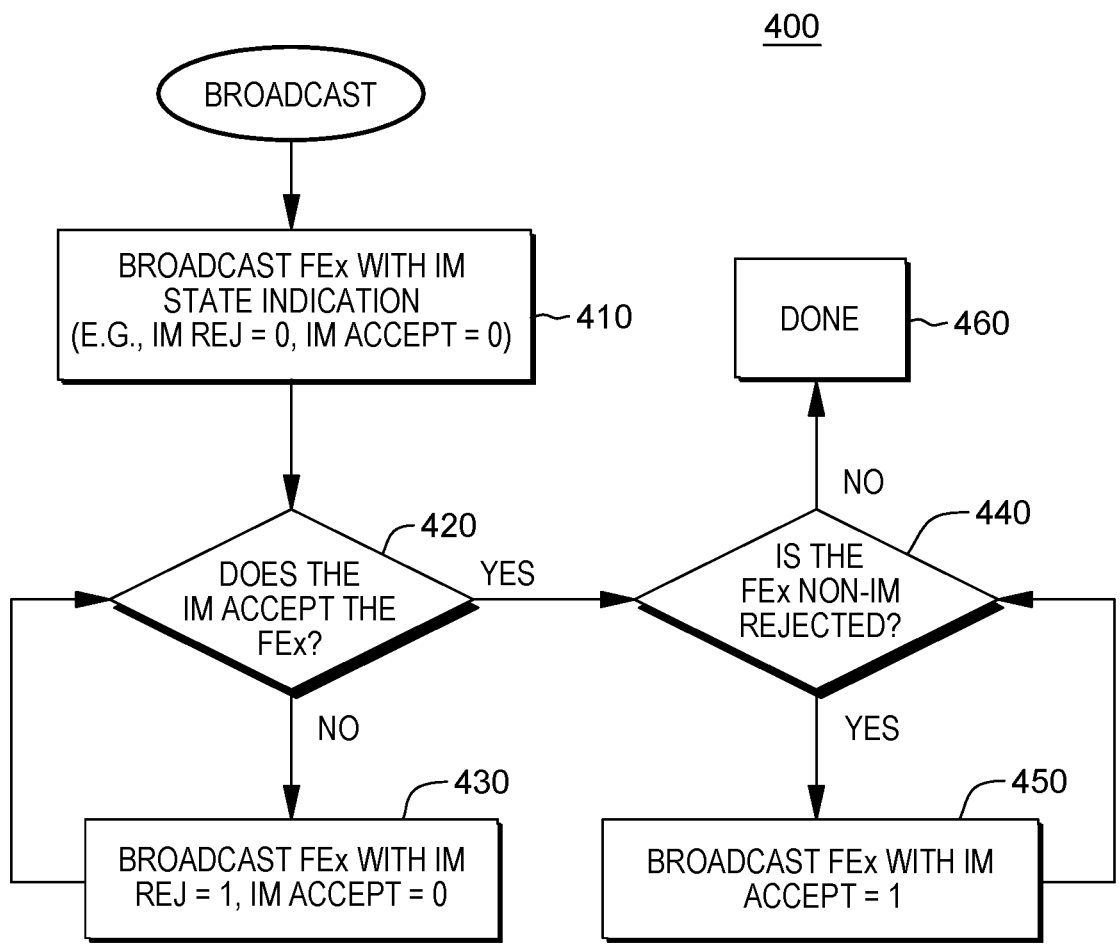
FIG. 4 depicts one example of broadcast processing, in accordance with one or more aspects of the present invention.
Figure 5:
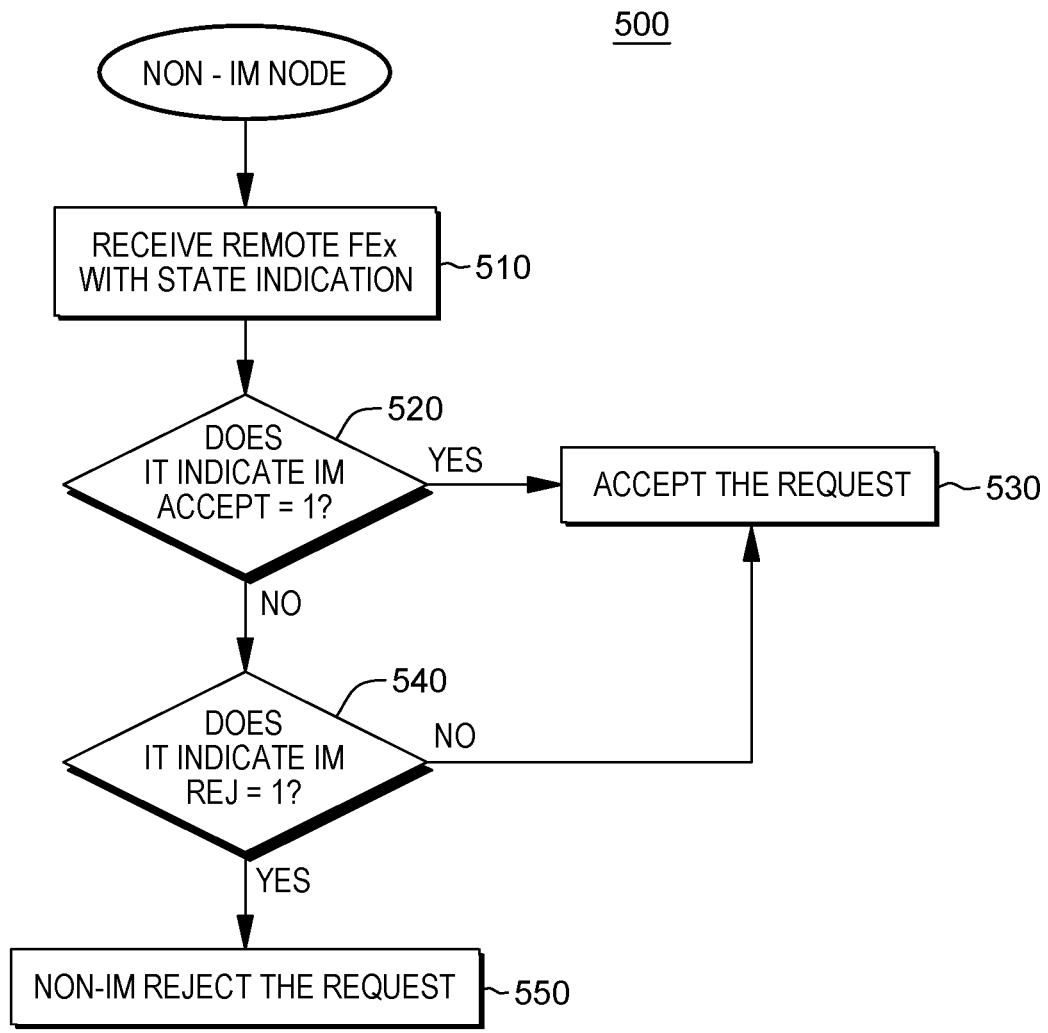
FIG. 5 depicts one example of non-intervention manager node processing, in accordance with one or more aspects of the present invention.
Figure 6:
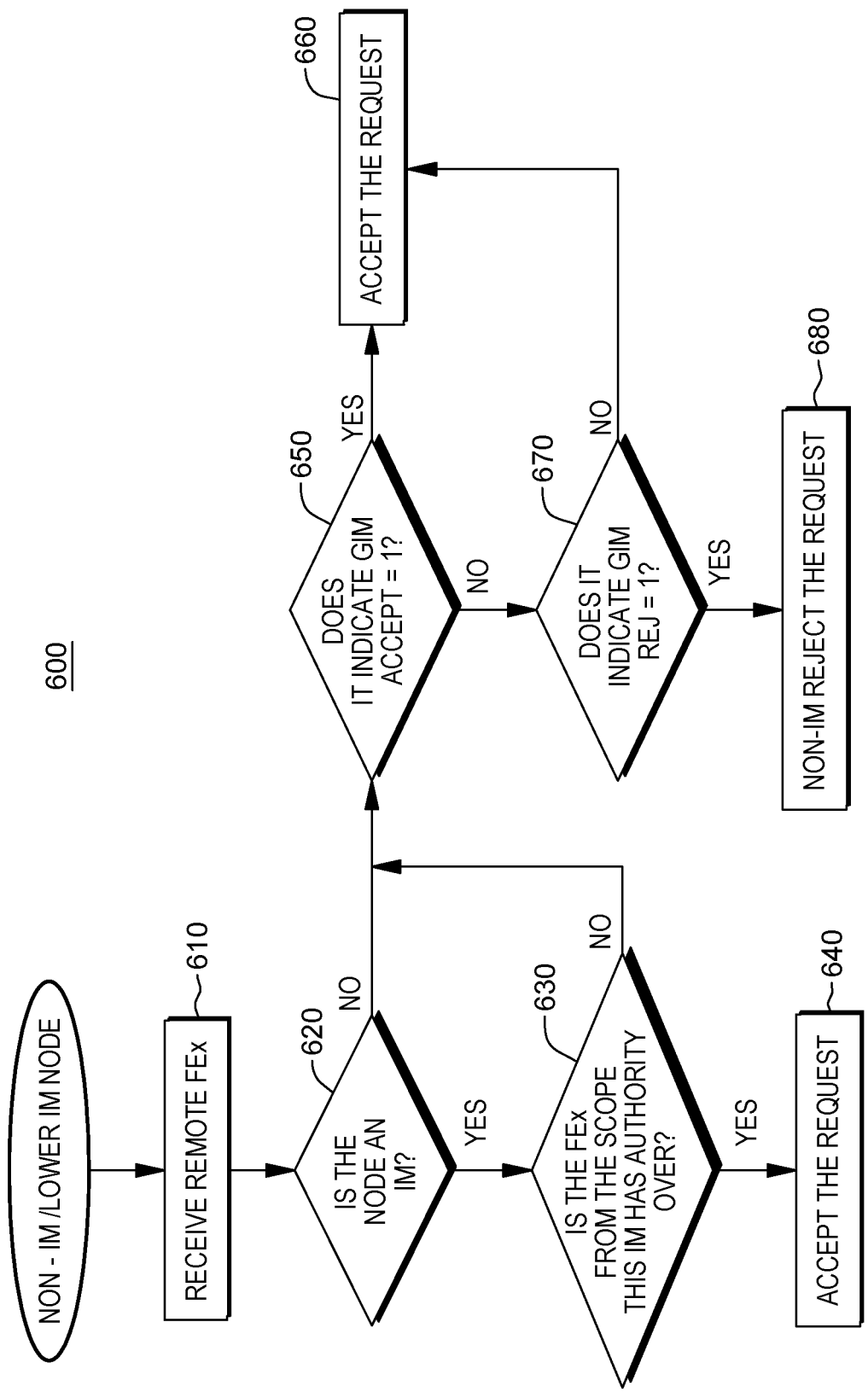
FIG. 6 depicts another example of non-intervention manager node processing, in accordance with one or more aspects of the present invention.

In one example, shared cache line protection module 150 includes one or more sub-modules (e.g., sub-modules 300-320) that are used in shared cache line protection processing, as further described with reference to FIGS. 4-6. In one example, FIG. 4 depicts one example of a broadcast exclusive fetch request process, in accordance with one or more aspects of the present invention; FIG. 5 depicts one example of a non-manager process to process the broadcast exclusive fetch request, in accordance with one or more aspects of the present invention; and FIG. 6 depicts another example of a non-manager process to process the broadcast exclusive fetch request, in accordance with one or more aspects of the present invention. In the one or more examples described with reference to FIGS. 4-6 (and FIGS. 7A-7F and 8), the manager node is referred to as an intervention manager node and the non-manager nodes are referred to as non-intervention manager nodes. However, other example manager/non-manager nodes may be used.

Each process is executed, in one or more examples, by one or more of a computer (e.g., computer 101, other computer(s), etc.), a server (e.g., remote server 104, other server(s)), a node, a processor and/or processing circuitry (e.g., of processor set 110 or other processor sets), etc. Although example computers, servers, nodes, processors and/or processing circuitry are provided, additional, fewer and/or other computers, servers, nodes, processors and/or processing circuitry may be used for the shared cache line protection processing and/or each of the processes. Various options are possible.

Referring, initially, to FIG. 4, in one example, shared cache line protection processing includes, for instance, a broadcast process 400 in which an exclusive fetch request of a cache line is broadcast 410 from a node (e.g., a requesting node, referred to herein as an FEx (fetch exclusive) node) of a plurality of nodes sharing the cache line. In accordance with an aspect of the present invention, the exclusive fetch request includes a state indication indicating whether a manager node of the plurality of nodes sharing the cache line accepted or rejected the exclusive fetch request. In this particular example, the state indication includes a manager rejection indicator (also referred to herein as an intervention manager (IM) rejection (REJ) indicator) and a manager accept indicator (also referred to herein as an intervention manager (IM) accept indicator), each set to an initial value (e.g., 0). However, in other examples, there may be additional, fewer and/or other indicators and/or state indications that indicate whether the manager node (e.g., intervention manager node) has accepted or rejected the request. Further, one or more indicators may be used to provide additional acceptance or rejection information and/or other information. Many variations are possible.

In one example, based on the broadcast, process 400 determines 420 whether the intervention manager node accepts the exclusive fetch. For instance, the intervention manager node accepts the request if the intervention manager node is not busy with another request for the cache line. If the intervention manager node is busy with another request for the cache line, it rejects the request. The acceptance/rejection is obtained by the process (e.g., by signal, indicator, condition code, return code, etc.).

If process 400 determines that the intervention manager node rejected the request, at least one state indicator is set. As an example, process 400 sets 430 the intervention manager rejection indicator to a selected value, such as 1, indicating that the request has been rejected by the intervention manager node, and the intervention manager accept indicator remains at or is re-set to another selected value, e.g., 0, indicating that the exclusive request has not been accepted by the intervention node manager. The exclusive fetch is re-broadcast 430 to the nodes, including the intervention manager node with the updated indicators, and processing continues at inquiry 420.

At inquiry 420, if process 400 determines that the exclusive fetch request has been accepted by the intervention manager node, then process 400 determines 440 whether a non-intervention manager node has rejected the exclusive fetch request. If process 400 determines that a non-intervention manager node has rejected the exclusive fetch request, then the exclusive fetch is re-broadcast 450 with at least one indicator (e.g., intervention manager accept) being set to a selected value, e.g., 1, and processing continues at inquiry 440. If process 400 determines 440 that the exclusive fetch is not rejected by a non-intervention manager node, then the broadcast processing is complete 460. The exclusive fetch is accepted allowing the requesting node to update the cache line and causing the other copies of the cache line to be invalidated.

One example of processing a received exclusive fetch request by a non-intervention manager node is described with reference to FIG. 5. In one example, a non-intervention manager process 500 obtains (e.g., receives, is provided, fetches, etc.) 510 a remote exclusive fetch request. For instance, it receives the request that was broadcast from a node requesting the exclusive fetch, and the request includes the state indication of the intervention manager node (e.g., IM accept and/or IM reject).

Based on obtaining the request, process 500 determines 520, for instance, whether the exclusive fetch request has an indication that the intervention manager node accepted the exclusive fetch request. In one example, this determination is made by checking the accept indicator included in the request. If the accept indicator is set to a selected value, such as 1, then the intervention manager node accepted the request. If the intervention manager accepted the request, then the non-intervention manager node accepts 530 the request, and therefore, invalidates its copy of the cache line. However, if the intervention manager node has not accepted the request, then process 500 further checks 540 whether the intervention manager node rejected the request. In one example, this determination is made by checking the rejection indicator included in the request. If the rejection indicator is set to a selected value, such as 1, then the intervention manager node rejected the request. If the intervention manager node rejected the request, then the non-intervention manager node rejects 550 the request and does not invalidate its copy of the cache line. Otherwise, in one example, the non-intervention manager node accepts 530 the request and invalidates its copy of the cache line.

Another example of processing a received exclusive fetch request by a non-intervention manager node is described with reference to FIG. 6. In this example, the computing environment includes multiple levels or scopes of intervention manager authority. For instance, a chip that holds the nodes may have intervention manager authority, as well as a drawer that includes the chips and the system. As an example, intervention manager authority is established for a fetched cache line and is associated with at least one node that has the cache line. Thus, a node on the chip may have chip level intervention manager authority for a selected cache line, a node in a drawer may have drawer level intervention manager authority for the selected cache line, a node in the system may have system level intervention manager authority for the selected cache line, and a node of a processor may have node level (e.g., lowest level) intervention manager authority for the selected cache line. A node may hold one or more than one level of intervention manager authority for a selected cache line, and a selected cache line may have one or more intervention manager authorities associated therewith (assigned to one or more than one node). The one or more authorities are indicated in the directory for the cache line, as an example.

In one example, the system node is considered to have the highest authority, referred to as global intervention manager authority (GIM). In this example, the exclusive fetch request indicates whether it has been accepted/rejected by the highest intervention manager authority. Further, the exclusive fetch request is to find the intervention manager of its current scope before it moves up a scope. Nodes with a lower intervention manager level than the exclusive fetch request's current scope can follow the non-intervention manager node behavior or perform no special behavior, as examples. An example of a lower intervention manager is a chip intervention manager node on a different chip than the one from which the exclusive fetch request originated. Other examples are possible. Intervention manager nodes that match the exclusive fetch request's current scope are not to reject the exclusive fetch request based on its indication of intervention manager rejection. These nodes can either invalidate themselves or demote themselves to a non-intervention manager copy depending on design specifics. For example, a chip intervention manager on the exclusive fetch request's home chip is not to indefinitely reject the exclusive fetch request because it will not get a chance to find the highest level intervention manager node in a higher scope.

In one example, a non-intervention manager/lower intervention manager process 600 obtains (e.g., receives, is provided, fetches, etc.) 610 a remote exclusive fetch request. For instance, it receives the request that was broadcast from a node requesting the exclusive fetch, and the request includes the state indication of the intervention manager node. In this example, the state indication is of an intervention manager of a selected level or scope (e.g., highest level or global level) and includes, for instance, GIM accept and/or GIM reject.

Based on obtaining the request, process 600 determines 620 whether the node obtaining the request is an intervention manager node. This determination is made by, for instance, checking the cache directory entry for the requested cache line that indicates the intervention manager(s) for the cache line. If the node is an intervention manager node, then process 600 further determines 630 whether the exclusive fetch request is from a scope over which this intervention manager node has authority. This is determined by, e.g., information in the exclusive fetch request that indicates where the request originated from in the system and based on its own directory state for the cache line. If the exclusive fetch request is from a scope over which this intervention manager node has authority, the intervention manager node accepts 640 the request and invalidates its copy of the cache line.

In one example, if the node is not an intervention manager node 620 or the exclusive fetch request is not from the scope over which this intervention manager node has authority 630, then process 600 determines 650, for instance, whether the exclusive fetch request has an indication that a global intervention manager (e.g., highest authority intervention manager in a nest or multiples levels of intervention managers) accepted the exclusive fetch request. In one example, this determination is made by checking the GIM accept indicator included in the request. If the accept indicator is set to a selected value, such as 1, then the global intervention manager accepted the request. If the global intervention manager accepted the request, then the non-intervention manager node or lower intervention manager node accepts 660 the request and invalidates its copy of the cache line. However, if the global intervention manager node has not accepted the request, then process 600 further checks 670 whether the global intervention manager node rejected the request. In one example, this determination is made by checking the GIM rejection indicator included in the request. If the rejection indicator is set to a selected value, such as 1, then the global intervention manager node rejected the request. If the global intervention manager node rejected the request, then the non-intervention manager node or lower intervention manager node rejects 680 the request and does not invalidate its copy of the cache line. Otherwise, the non-intervention manager node or lower intervention manager node accepts 660 the request and invalidates its copy of the cache line.

Figure 7A:
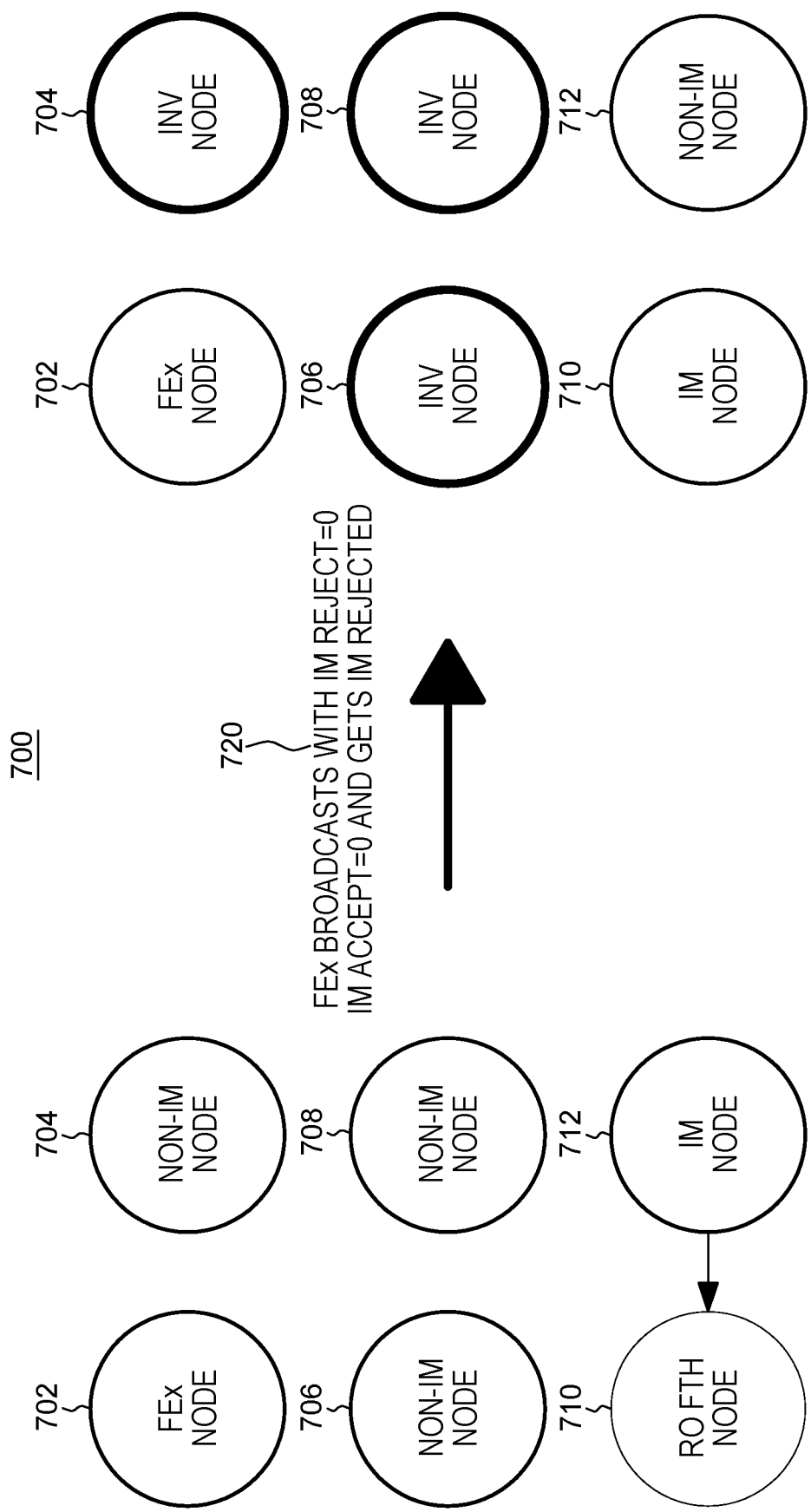
FIGS. 7A-7F pictorially depict one example of shared cache line protection, in accordance with one or more aspects of the present invention.
Figure 7B:
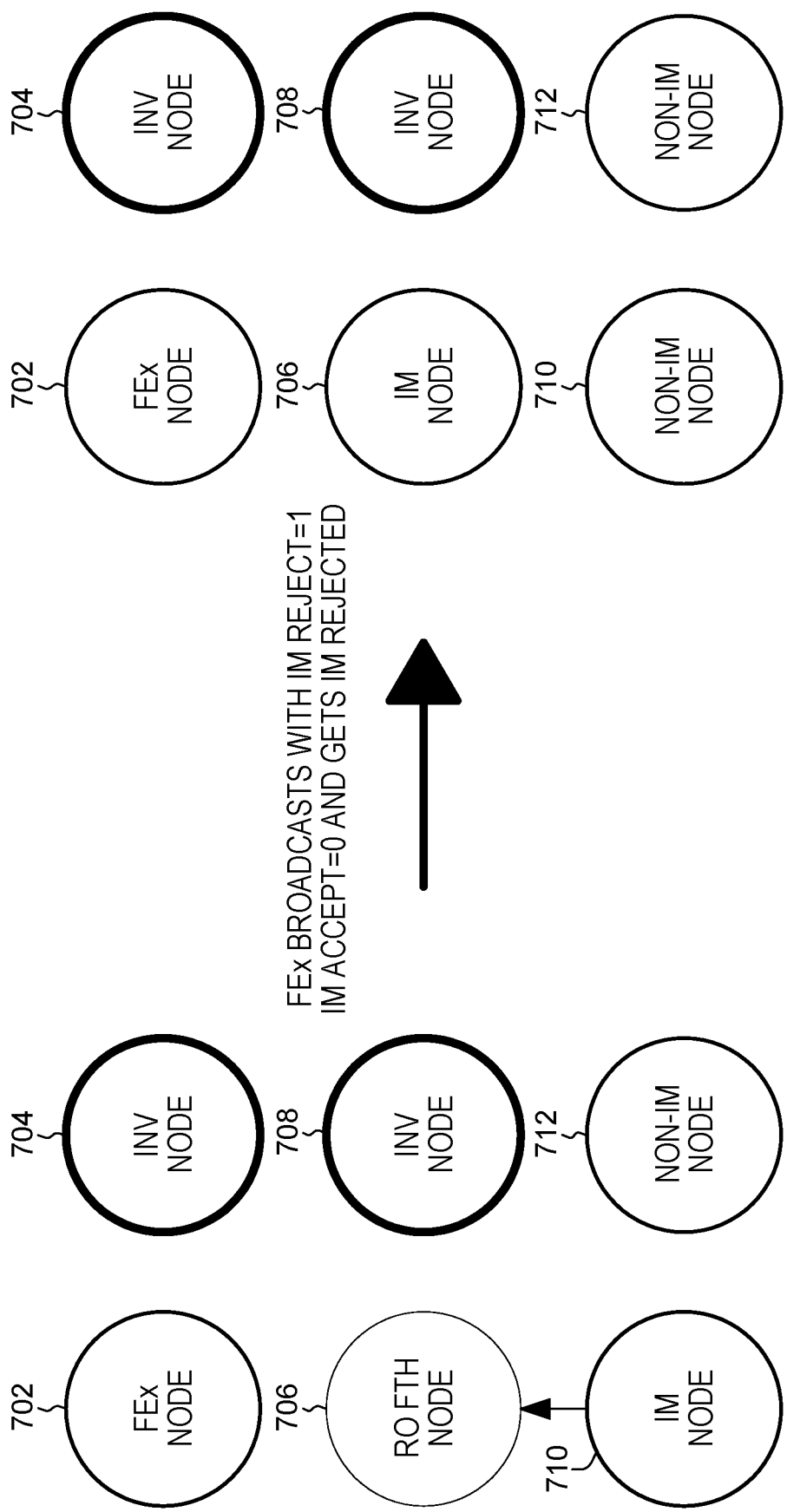
Figure 7C:
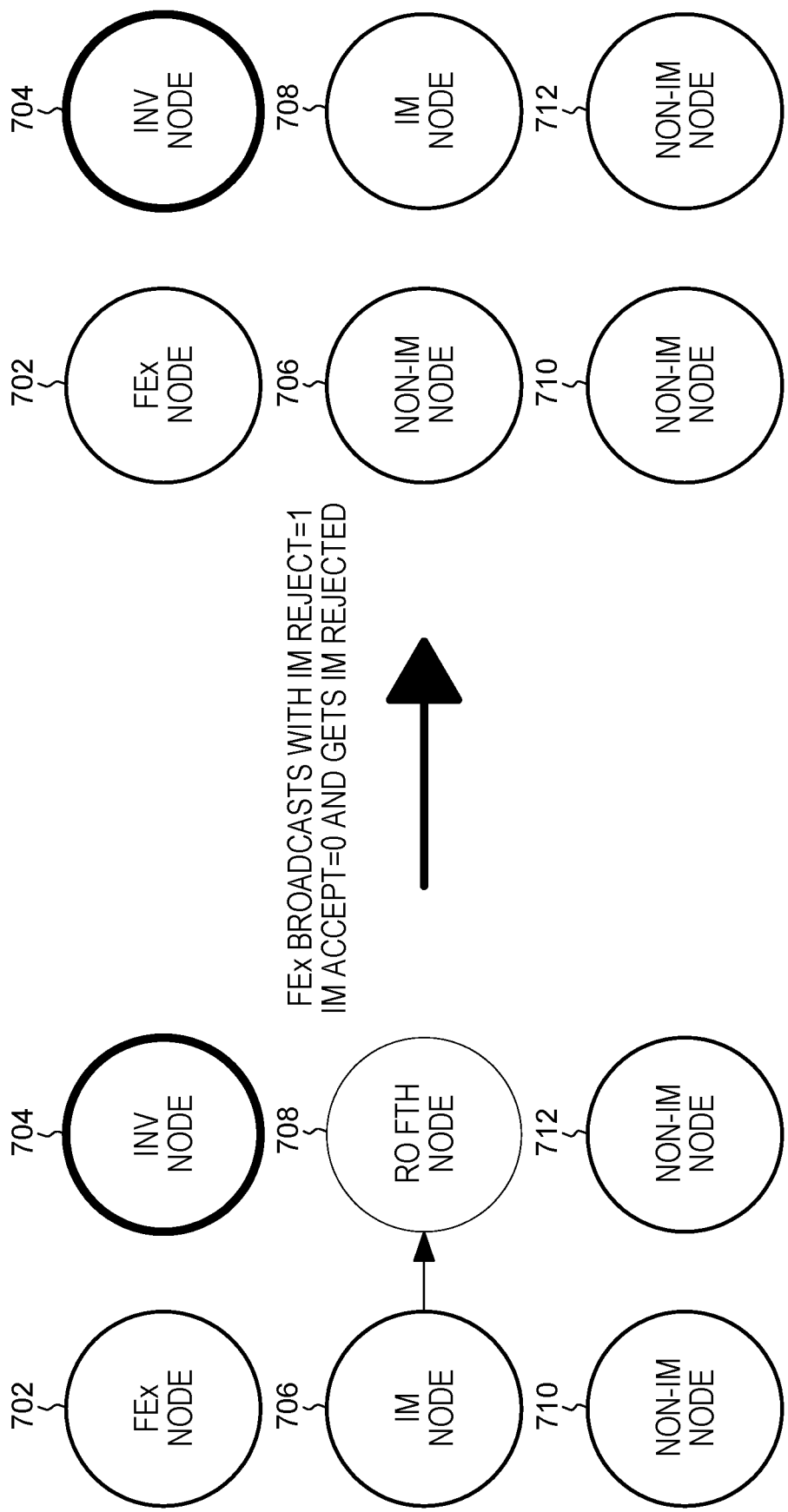
Figure 7D:
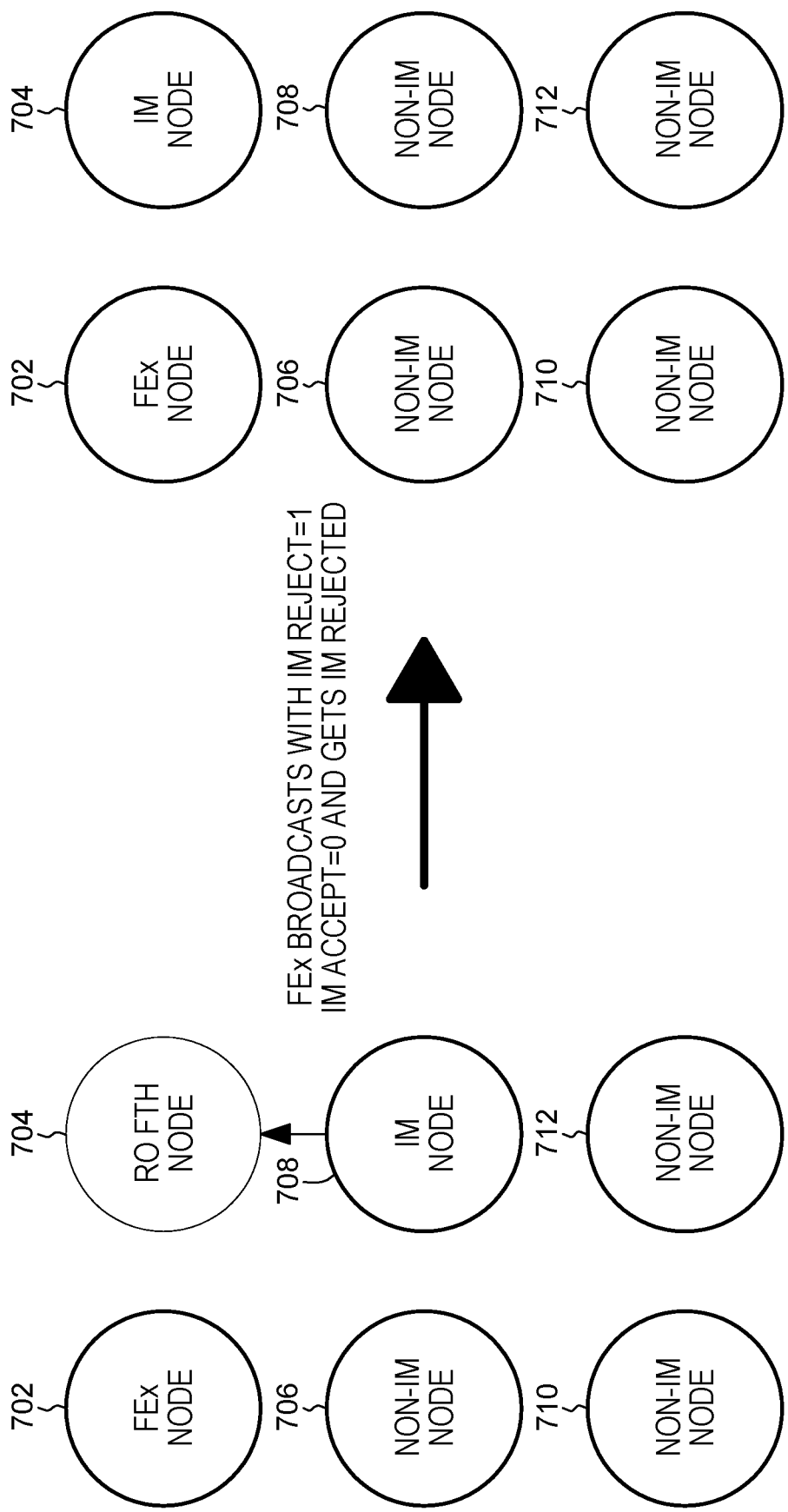
Figure 7E:
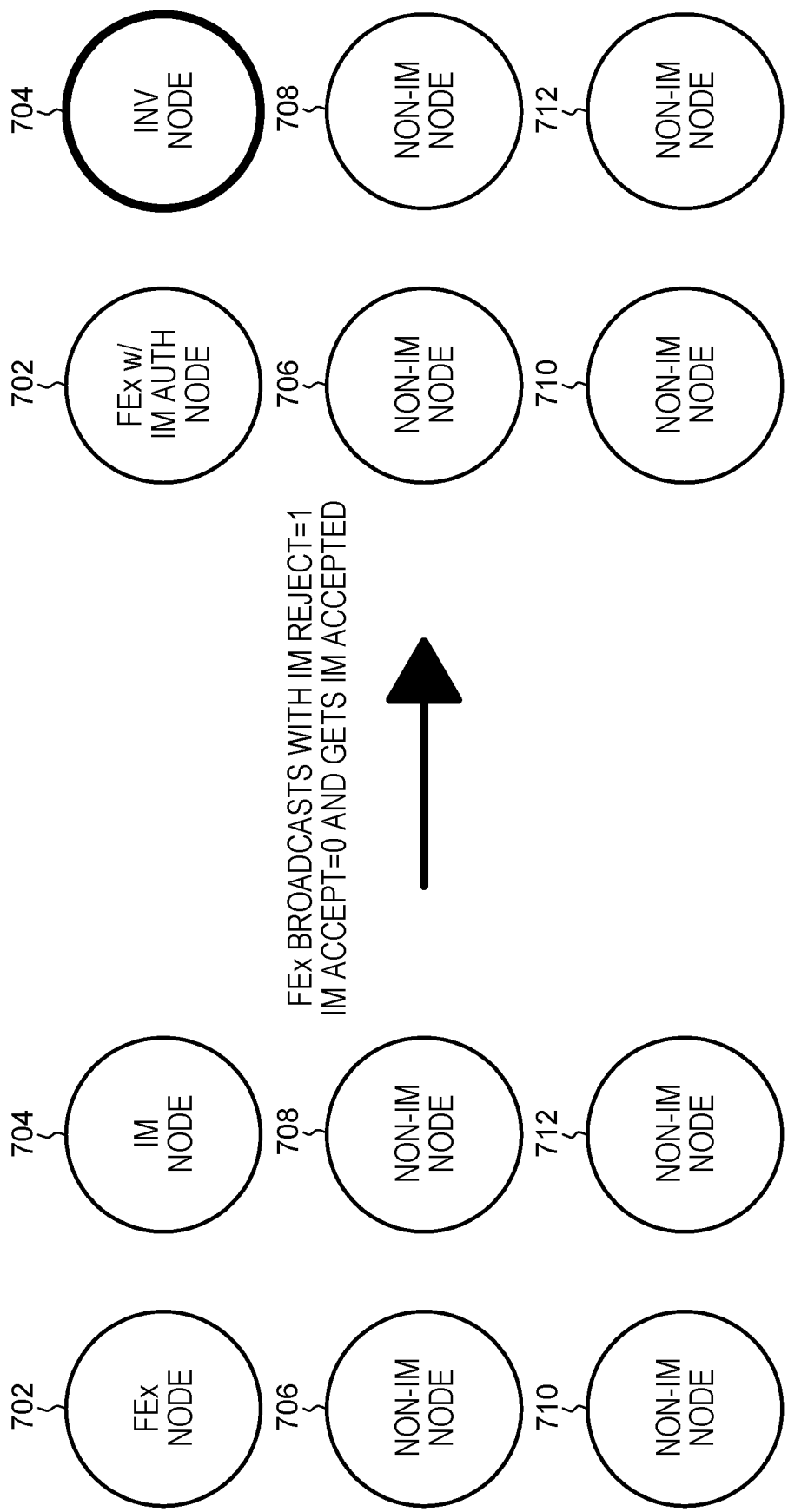
Figure 7F:
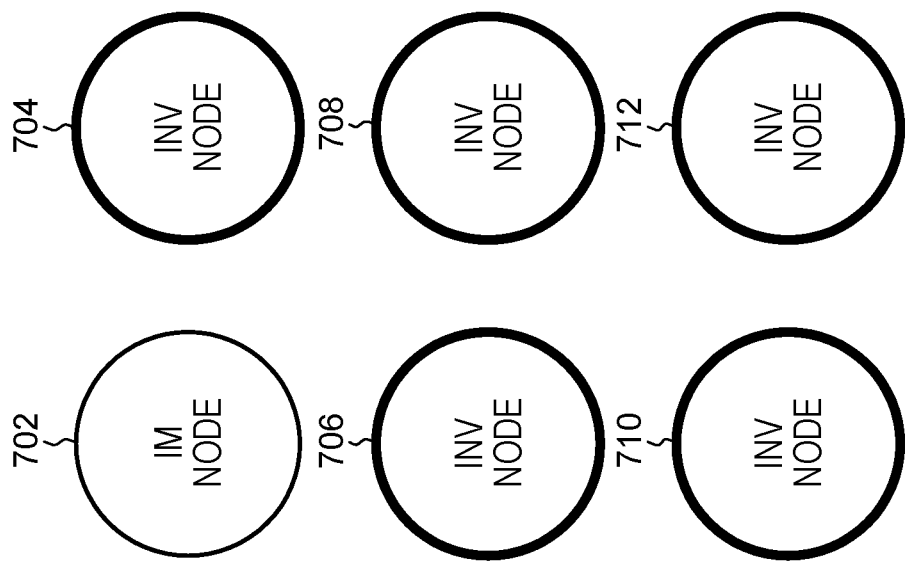
Figure 7F:
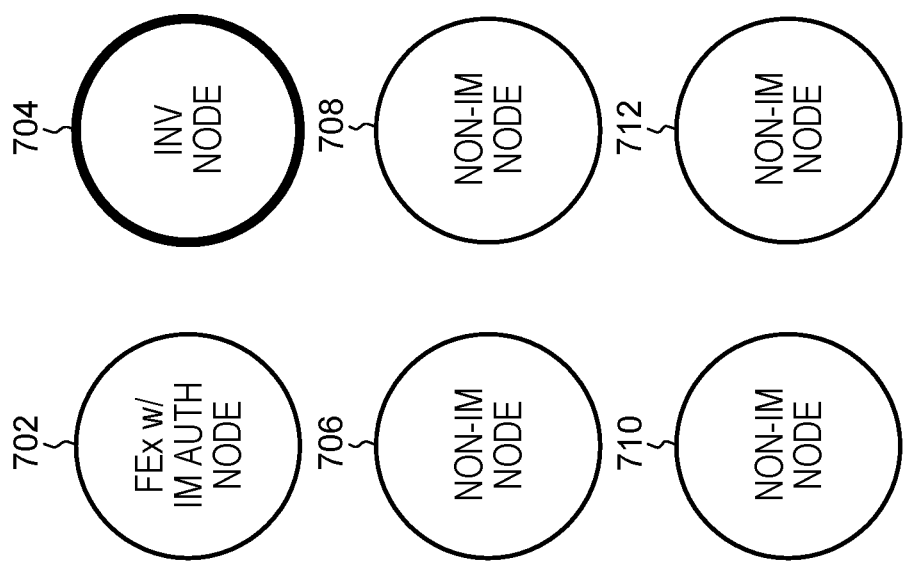

One example of a pictorial depiction of aspects of the invention is described with reference to FIGS. 7A-7F. Referring initially to FIG. 7A, a computing environment 700 includes a plurality of nodes, including, for instance, a node 702 that is broadcasting an exclusive fetch (FEx) request, a plurality of nodes 704-708 that are non-intervention manager nodes at the time of this broadcast, a node 710 that is requesting read-only fetch (RO Fth) access of the cache line and a node 712 that is, at the time of this broadcast, an intervention manager node that has responsibility for accepting/rejecting the requests for the cache line, including the exclusive fetch request and the read-only fetch request. In this example, the exclusive fetch request is broadcast 720 with the intervention manager rejection indicator being set to a selected value, e.g., 0, indicating the intervention manager has not rejected the request and with the intervention manager accept indicator being set to a selected value, e.g., 0, indicating the intervention manager has not yet accepted the request. With such an indication, in this example, nodes 704-708 accept the exclusive fetch request and invalidate (INV) their copies of the cache line, as shown on the right side of the arrow. Further, in this example, node 712 acting as the intervention manager node accepts the read-only fetch request of node 710, and therefore, rejects the exclusive fetch request. In one example, based on accepting the read-only fetch request, node 712 is downgraded to a non-intervention manager node 712 (e.g., by changing the manager indication in the cache directory entry for this cache line), and node 710 becomes an intervention manager node 710 (e.g., by changing the manager indication in the cache directory entry for this cache line), again as illustrated on the right side of the arrow.

Since the exclusive fetch was not accepted by the intervention manager node, it is re-broadcast. In one example, referring to FIG. 7B, node 702 re-broadcasts the exclusive fetch request, in which the intervention manager rejection indicator is set to a selected value, such as 1, indicating that the intervention manager has rejected the request and the intervention manager accept indicator is set to a selected value, such as 0, indicating that the intervention manager has not accepted the request. Further, in this example, based on the previous broadcast (FIG. 7A), nodes 704 and 708 continue to have invalidated copies of the cache line, node 710 is the intervention manager node and node 712 remains a non-intervention manager node. Additionally, node 706 that previously invalidated its copy of the cache line based on previously accepting the exclusive fetch request is requesting a read-only fetch copy of the cache line. Based on the requests, the exclusive fetch is again rejected by the intervention manager node (e.g., intervention manager node 710), which accepts the read-only request by node 706. Thus, as shown to the right of the arrow, in one example, intervention manager node 710 becomes a non-intervention manager node and node 706 becomes the intervention manager node.

Once again, since the exclusive fetch was not accepted by the intervention manager node, it is re-broadcast. In one example, referring to FIG. 7C, node 702 re-broadcasts the exclusive fetch request, in which the intervention manager rejection indicator is set to a selected value, such as 1, indicating that the intervention manager has rejected the request and the intervention manager accept indicator is set to a selected value, such as 0, indicating that the intervention manager has not accepted the request. Further, in this example, based on a previous broadcast, node 704 continues to have an invalidated copy of the cache line, node 706 is the intervention manager node and nodes 710, 712 remain non-intervention manager nodes. Additionally, node 708 that previously invalidated its copy of the cache line based on previously accepting the exclusive fetch request is requesting a read-only fetch copy of the cache line. Based on the requests, the exclusive fetch is rejected by intervention manager node 706, which accepts the read-only request by node 708. Thus, as shown to the right of the arrow, intervention manager node 706 becomes a non-intervention manager node and node 708 becomes the intervention manager node.

Once again, since the exclusive fetch was not accepted by the intervention manager node, it is re-broadcast. In one example, referring to FIG. 7D, node 702 re-broadcasts the exclusive fetch request, in which the intervention manager rejection indicator is set to a selected value, such as 1, indicating that the intervention manager has rejected the request and the intervention manager accept indicator is set to a selected value, such as 0, indicating that the intervention manager has not accepted the request. Further, in this example, based on the previous broadcast (FIG. 7C), node 708 is the intervention manager node and nodes 706, 710, 712 remain non-intervention manager nodes. Additionally, node 704 that previously invalidated its copy of the cache line based on previously accepting the exclusive fetch is requesting a read-only fetch copy of the cache line. Based on the requests, the exclusive fetch is rejected by intervention manager node 708, which accepts the read-only request by node 704. Thus, as shown to the right of the arrow, intervention manager node 708 becomes a non-intervention manager node and node 704 becomes the intervention manager node.

Once again, since the exclusive fetch was not accepted by the intervention manager node, it is re-broadcast. In one example, referring to FIG. 7E, node 702 re-broadcasts the exclusive fetch request, in which the intervention manager rejection indicator is set to a selected value, such as 1, indicating that the intervention manager has rejected the request and the intervention manager accept indicator is set to a selected value, such as 0, indicating that the intervention manager has not accepted the request. Further, in this example, based on the previous broadcast (FIG. 7D), node 704 is the intervention manager node and nodes 706, 708, 710, 712 are non-intervention manager nodes. Based on the exclusive fetch request and no contention on the line (e.g., none of the nodes are requesting the cache line), the exclusive fetch request is accepted by intervention manager node 704. Thus, as shown to the right of the arrow, intervention manager node 704 invalidates its copy of the cache line and becomes a non-intervention manager node and node 702 obtains intervention manager node authority for the exclusive fetch.

Based on the foregoing, the exclusive fetch is re-broadcast. In one example, referring to FIG. 7F, intervention manager node 702 now having authority for the exclusive fetch broadcasts the exclusive fetch request with the intervention manager accept indicator set to a selected value, such as 1, indicating that the intervention manager has accepted the request. Based on the broadcast, broadcast node 702 becomes the intervention manager node, node 704 continues to have an invalid copy of the cache line, and non-intervention manager nodes 706-712 invalidate their copies of the cache line.

Another example of a broadcast is depicted in FIG. 8. In this example, a computing environment 800 includes a plurality of nodes, including a broadcast node 802 that broadcasts an exclusive fetch for a cache line, in which the intervention manager rejection indicator is set to a selected value, such as 0, indicating that the intervention manager has not rejected the request. The plurality of nodes further includes four non-intervention manager nodes 804-810 and an intervention manager node 812. In this example, there is no contention for the cache line, and therefore, intervention manager node 812 accepts the broadcast and invalidates its cached copy of the cache line, as shown to the right of the arrow. Further, node 802 becomes the intervention manager node and is able to obtain the exclusive fetch. The other nodes (e.g., nodes 804-810) also accept the exclusive fetch request and invalidate their copies of the cache line.

Described herein is one example of a capability to protect shared cache lines from unnecessary invalidation. In one or more aspects, as many copies, as possible, of a contested cache line are preserved when an exclusive fetch of the cache line has been rejected by an intervention manager node. In one example, no special handling is performed on an initial broadcast of the exclusive fetch, since, at this point, it is unknown whether the line is contested. However, on re-broadcasts of the exclusive fetch, the non-intervention manager nodes reject the exclusive fetch request until the exclusive fetch request has been accepted by the intervention manager node, and thus, do not invalidate their copies of the cache line.

In one example, on an initial broadcast of the exclusive fetch request, at least most (and possibly all) of the non-intervention manager nodes receiving the initial broadcast will invalidate their copies of the requested cache line (some may be out of resources). However, on a re-broadcast, based on the exclusive fetch being rejected by the intervention manager node, non-intervention manager nodes (i.e., the contested cache lines of these nodes) are protected from invalidation, in accordance with one or more aspects of the present invention. The line is under contention so new non-intervention manager nodes are created (e.g., copies of the line are fetched in read-only mode) after the initial broadcast of the exclusive fetch request. Without one or more aspects of the invention, these non-intervention manager nodes (e.g., the copies of the cache line) are repeatedly invalidated by the retrying of the exclusive fetch. These nodes have to re-fetch the line and further increase contention making the exclusive fetch less likely to be accepted by the intervention manager. However, in accordance with one or more aspects of the present invention, these non-intervention manager nodes do not accept the exclusive fetch request until a predefined event, e.g., it has been accepted by the intervention manager node. When the predefined event occurs, e.g., the exclusive fetch request is accepted by the intervention manager node, the non-intervention manager nodes accept the exclusive fetch request and then invalidate their copies of the cache line.

In one or more aspects, an exclusive fetch request that is to be broadcast to a plurality of nodes of a computing environment includes state information regarding the exclusive fetch request. For instance, the state information indicates whether the exclusive fetch request has been accepted by the intervention manager node, whether it has been rejected by the intervention manager node or neither, as examples. Non-intervention manager nodes use this information to decide whether to accept or reject the exclusive fetch request. If the exclusive fetch request was rejected by the intervention manager node, the non-intervention manager nodes also reject the exclusive fetch request (at least until it is accepted by the intervention manager node). If the exclusive fetch request has been accepted by the intervention manager node, then non-intervention manager nodes may accept the exclusive fetch request and invalidate their copies of the requested line.

In one or more aspects, the rejection indication can further be refined to, e.g., indicate a rejection in selected circumstances (e.g., the intervention manager node was busy for the target line of the exclusive fetch). This excludes cases where the intervention manager node rejection is due to a lack of request servicing resources, as an example.

In one or more aspects, the protection extends to computing environments with multiple scopes of intervention manager authority.

In one or more aspects, processing within a computing environment is facilitated. A node of the computing environment obtains an exclusive fetch request of a cache line shared by, at least, the node and a manager node of the computing environment. The exclusive fetch request includes a state indication regarding processing of the exclusive fetch request by the manager node. The node processes the exclusive fetch request, based on the state indication included with the exclusive fetch request regarding processing of the exclusive fetch request by the manager node.

By including the state indication with the exclusive fetch request, the node can determine how to process the request. For instance, the node may accept the request, based on the state indication, and thus, invalidate its copy of the cache line; or the node may reject the request, based on the state indication, and therefore, not invalidate its copy of the cache line. This facilitates processing by performing invalidations of the cache line in selected circumstances, such as based on the state indication, rather than invalidating on each re-broadcast of the exclusive fetch request. This enables the number of invalidations of the cache line to be reduced, thereby protecting copies of the cache line.

In one embodiment, the state indication includes an accept indicator indicating whether the manager node has accepted the exclusive fetch request. This facilitates processing by indicating to the node when the manager node has accepted the exclusive fetch request. Therefore, the node can also accept the exclusive fetch request and invalidate its copy of the cache line, rather than invalidating on each re-try of the exclusive fetch. This saves processing cycles and reduces system memory access.

In one embodiment, the state indication further includes a rejection indicator indicating whether the manager node has rejected the exclusive fetch request. This facilitates processing by indicating to the node when the manager node has rejected the exclusive fetch request, and therefore, the node can also reject the exclusive fetch request and not invalidate its copy of the cache line. This facilitates processing by reducing the number of invalidations of the cache line by the node.

In one embodiment, the state indication includes a rejection indicator indicating whether the manager node has rejected the exclusive fetch request. This facilitates processing by indicating to the node when the manager node has rejected the exclusive fetch request, and therefore, the node can also reject the exclusive fetch request and not invalidate its copy of the cache line. This facilitates processing by reducing the number of invalidations of the cache line by the node.

In one embodiment, the rejection indicator further indicates a reason for rejecting the exclusive fetch request. This facilitates processing by indicating to the node when the manager node has rejected the exclusive fetch request for a selected reason, and therefore, the node can decide to reject the exclusive fetch request and not invalidate its copy of the cache line. This facilitates processing by reducing the number of invalidations of the cache line by the node.

In one embodiment, the processing includes determining, based on the rejection indicator, that the manager node has rejected the exclusive fetch request for a selected reason. Based on determining that the manager node has rejected the exclusive fetch request for the selected reason, the node rejects the exclusive fetch request. By using the rejection indicator provided with the exclusive fetch request, the node can determine how to process the request. For instance, the node may reject the request, based on the rejection indicator, and therefore, not invalidate its copy of the cache line. This facilitates processing by not performing invalidations of the cache line in certain circumstances, such as based on a rejection of the exclusive fetch request by the manager node for the selected reason. This enables the number of invalidations of the cache line to be reduced, thereby protecting copies of the cache line.

In one embodiment, the processing includes determining, based on the state indication, that the manager node has rejected the exclusive fetch request. Based on determining that the manager node has rejected the exclusive fetch request, the node rejects the exclusive fetch request. By using the state indication provided with the exclusive fetch request, the node can determine how to process the request. For instance, the node may reject the request, based on the state indication indicating that the manager node rejected the exclusive fetch request, and therefore, not invalidate its copy of the cache line. This facilitates processing by not performing invalidations of the cache line in certain circumstances, such as based on a rejection of the exclusive fetch request by the manager node. This enables the number of invalidations of the cache line to be reduced, thereby protecting copies of the cache line.

In one embodiment, the computing environment includes a plurality of nodes to receive the exclusive fetch request. Based on determining that the manager node has rejected the exclusive fetch request, the rejecting is performed by the plurality of nodes receiving the exclusive fetch request. By using the state indication provided with the exclusive fetch request, the nodes can determine how to process the request. For instance, the nodes may reject the request, based on the state indication indicating that the manager node has rejected the exclusive fetch request, and therefore, not invalidate their copies of the cache line. This facilitates processing by not performing invalidations of copies of the cache line in certain circumstances, such as based on a rejection of the exclusive fetch request by the manager node. This enables the number of invalidations of the cache line to be reduced, thereby protecting copies of the cache line.

In one embodiment, the processing includes determining, based on the state indication, that the manager node has accepted the exclusive fetch request. Based on determining that the manager node has accepted the exclusive fetch request, the node accepts the exclusive fetch request. By using the state indication to determine that the manager node has accepted the exclusive fetch request, the node can also accept the exclusive fetch request and invalidate its copy of the cache line, rather than invalidate on each re-try of the exclusive fetch. This saves processing cycles and reduces system memory access.

In one embodiment, the computing environment includes multiple levels of manager nodes, and the state indication for which the processing is based is the state indication of a selected manager node on a selected level of the multiple levels. By including the appropriate state indication with the exclusive fetch request, the node can determine how to process the request. For instance, the node may accept the request, based on the state indication, and thus, invalidate its copy of the cache line; or the node may reject the request, based on the state indication, and therefore, not invalidate its copy of the cache line. This facilitates processing by performing invalidations of the cache line in selected circumstances, such as based on the state indication, rather than invalidating on each re-broadcast of the exclusive fetch request. This enables the number of invalidations of the cache line to be reduced, thereby protecting copies of the cache line.

Although various examples are provided herein, other examples/embodiments are possible. For example, other circumstances may be provided for selective rejection. Moreover, additional, fewer and/or other nodes than described herein may receive the broadcast. Additionally, the exclusive fetch request may include additional, fewer and/or other indicators than described herein and/or the indicators may provide additional information. Many variations are possible.

One or more aspects of the present invention are tied to computer technology and facilitate processing within a computer, improving performance thereof. For instance, cache invalidations are reduced, reducing access to memory and the use of computer resources, improving processing and/or processing speed within a processor/computer/computing environment. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other indicators and/or broadcast requests may be used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      obtaining, by a node of the computing environment, an exclusive fetch request of a cache line shared by, at least, the node and a manager node of the computing environment, the exclusive fetch request including a state indication regarding processing of the exclusive fetch request by the manager node; and
      processing, by the node, the exclusive fetch request, based on the state indication included with the exclusive fetch request regarding processing of the exclusive fetch request by the manager node.

2. The computer program product of claim 1, wherein the state indication includes an accept indicator indicating whether the manager node has accepted the exclusive fetch request.

3. The computer program product of claim 2, wherein the state indication further includes a rejection indicator indicating whether the manager node has rejected the exclusive fetch request.

4. The computer program product of claim 1, wherein the state indication includes a rejection indicator indicating whether the manager node has rejected the exclusive fetch request.

5. The computer program product of claim 4, wherein the rejection indicator further indicates a reason for rejecting the exclusive fetch request.

6. The computer program product of claim 5, wherein the processing includes:
   determining, based on the rejection indicator, that the manager node has rejected the exclusive fetch request for a selected reason; and
   rejecting, by the node, the exclusive fetch request based on determining that the manager node has rejected the exclusive fetch request for the selected reason.

7. The computer program product of claim 1, wherein the processing includes:
   determining, based on the state indication, that the manager node has rejected the exclusive fetch request; and
   rejecting, by the node, the exclusive fetch request based on determining that the manager node has rejected the exclusive fetch request.

8. The computer program product of claim 7, wherein the computing environment includes a plurality of nodes to receive the exclusive fetch request, and wherein the rejecting is performed by the plurality of nodes receiving the exclusive fetch request, based on determining that the manager node rejected the exclusive fetch request.

9. The computer program product of claim 1, wherein the processing includes:
   determining, based on the state indication, that the manager node has accepted the exclusive fetch request; and
   accepting, by the node, the exclusive fetch request based on determining that the manager node has accepted the exclusive fetch request.

10. The computer program product of claim 1, wherein the computing environment includes multiple levels of manager nodes, and wherein the state indication for which the processing is based is the state indication of a selected manager node on a selected level of the multiple levels.

11. A computer system for facilitating processing within a computing environment, the computer system comprising:
   a memory; and
   a processor in communication with the memory, wherein the computer system is configured to perform a method, said method comprising:
      obtaining, by a node of the computing environment, an exclusive fetch request of a cache line shared by, at least, the node and a manager node of the computing environment, the exclusive fetch request including a state indication regarding processing of the exclusive fetch request by the manager node; and
      processing, by the node, the exclusive fetch request, based on the state indication included with the exclusive fetch request regarding processing of the exclusive fetch request by the manager node.

12. The computer system of claim 11, wherein the state indication includes an accept indicator indicating whether the manager node has accepted the exclusive fetch request.

13. The computer system of claim 11, wherein the state indication includes a rejection indicator indicating whether the manager node has rejected the exclusive fetch request.

14. The computer system of claim 11, wherein the processing includes:
   determining, based on the state indication, that the manager node has rejected the exclusive fetch request; and
   rejecting, by the node, the exclusive fetch request based on determining that the manager node has rejected the exclusive fetch request.

15. The computer system of claim 11, wherein the processing includes:
   determining, based on the state indication, that the manager node has accepted the exclusive fetch request; and
   accepting, by the node, the exclusive fetch request based on determining that the manager node has accepted the exclusive fetch request.

16. A computer-implemented method of facilitating processing within a computing environment, the computer-implemented method comprising:
   obtaining, by a node of the computing environment, an exclusive fetch request of a cache line shared by, at least, the node and a manager node of the computing environment, the exclusive fetch request including a state indication regarding processing of the exclusive fetch request by the manager node; and
   processing, by the node, the exclusive fetch request, based on the state indication included with the exclusive fetch request regarding processing of the exclusive fetch request by the manager node.

17. The computer-implemented method of claim 16, wherein the state indication includes an accept indicator indicating whether the manager node has accepted the exclusive fetch request.

18. The computer-implemented method of claim 16, wherein the state indication includes a rejection indicator indicating whether the manager node has rejected the exclusive fetch request.

19. The computer-implemented method of claim 16, wherein the processing includes:
   determining, based on the state indication, that the manager node has rejected the exclusive fetch request; and
   rejecting, by the node, the exclusive fetch request based on determining that the manager node has rejected the exclusive fetch request.

20. The computer-implemented method of claim 16, wherein the processing includes:
- determining, based on the state indication, that the manager node has accepted the exclusive fetch request; and
- accepting, by the node, the exclusive fetch request based on determining that the manager node has accepted the exclusive fetch request.

\* \* \* \* \*